United States Patent [19]

Cameron et al.

[11] Patent Number: 4,837,278

[45] Date of Patent: Jun. 6, 1989

[54] CURABLE COATING COMPOSITION

[75] Inventors: James M. Cameron, Maumee; Timothy P. Stanton, Perrysburg; Anthony J. Tye, Toledo, all of Ohio; Timothy S. December, Farmington Hills, Mich.

[73] Assignee: BASF Corporation, Clifton, N.J.

[21] Appl. No.: 120,575

[22] Filed: Nov. 13, 1987

[51] Int. Cl.[4] .............................................. C08L 61/00
[52] U.S. Cl. .................................... 525/162; 525/443; 525/456; 525/510; 525/511; 428/417; 428/418; 428/425.1; 428/425.8; 428/431; 428/436; 428/458; 428/460; 428/461; 428/481
[58] Field of Search ............... 525/162, 443, 456, 510, 525/511, 523

[56] References Cited

U.S. PATENT DOCUMENTS

| | | | |
|---|---|---|---|
| 4,425,466 | 1/1984 | Santer et al. | 524/512 |
| 4,575,536 | 3/1986 | Yamada et al. | 525/162 |
| 4,632,964 | 12/1986 | Altschuler et al. | 525/456 |
| 4,634,738 | 1/1987 | Santer | 525/162 |

Primary Examiner—Theodore E. Pertilla
Attorney, Agent, or Firm—Michael R. Chipaloski

[57] ABSTRACT

The invention relates to a reduced temperature coating composition which dries to form films exhibiting desirable properties comprises a blend of (1) a principle film forming resin with reactive functional groups, typically hydroxyl, and (2) a fully alkylated, low imino aminoplast.

8 Claims, 1 Drawing Sheet

CURABLE COATING COMPOSITION

BACKGROUND OF THE INVENTION

This invention relates to reduced and ambient temperature curable paint compositions containing amino cross-linking agents and particularly to such compositions containing fully alkylated, low imino aminoplast cross-linking agents.

Changing market preferences and increasing manufacturing concerns have inspired the automotive refinish industry to seek alternative coatings curing chemistries to isocyanate based coatings for reduced and ambient temperature curing systems.

Thermoplastic coating systems are well established for reduced and ambient temperature applications. However these coatings, typically high molecular weight polymers which form films through solvent evaporation, usually require additional processing to achieve the desired appearance, for example, in topcoats, and/or lack the desired physical properties, such as chemical resistance or exterior durability. In comparison, thermosetting coating systems, typically lower molecular weight polymers that build molecular weight during film formation through cross-linking of polymer chains, generally require less processing after application and are superior in physical properties relative to thermoplastic coating systems.

A number of isocyanate-free, reduced and ambient temperature curing, thermosetting coating systems are well established, however, these systems are usually lacking in some aspect of coatings performance, such as: speed of coating cure at reduced temperatures; humidity of chemical resistance; initial color or color change upon exterior exposure, a property important in topcoats; substrate adhesion; etc.

This invention relates to a curable coating compositions containing a film forming polymer cure with an aminoplast cross-linking agent and particularly to such compositions containing a fully alkylated aminoplast of a low imino content.

Often, known coating systems based on conventional thermosetting aminoplast resins require elevated temperatures of at least 82 C. for adequate curing. It would be desirable to provide a coating method in which relatively low temperatures, for example, below about 71 C. and preferably ambient temperatures, could be utilized. Previous attempts to develop such coating systems resulted in systems which had the disadvantages of being too time consuming and/or energy intensive or resulted in cured films which were deficient in various combinations of physical properties.

In accordance with the present invention, a coating composition and coating system have been developed which provides a superior rate of cure at reduced temperatures and results in coated products in which the films exhibit an excellent combination of properties for an intended application.

SUMMARY OF THE PRESENT INVENTION

The present invention is therefore directed to a reduced and ambient temperature cure coating composition containing a functional film forming resin and a fully alkylated, low imino aminoplast cross-linking agent. More particularly, the invention comprises a coating composition of:

a. a film forming resin(s) with pendant reactive functional groups, generally hydroxyl.

b. a substantially fully alkylated and low imino aminoplast as indicated by a lower Fourier transform infrared spectroscopic absorption value in the region of 3250–3650 $cm^{-1}$ relative to a more conventional aminoplast such as Cymel 303 (American Cyanamid Corp.) (refer to FIG. 1) with comprising nuclei selected from the group consisting of melamine, acetoguanamine, adipoguanamine, and benzoguanamine and attached thereto alkyloxymethyl groups in the range of about 2n−2 to about 2n per nucleus, where n is the number of amino groups per nucleus.

Said curable coating composition is especially useful in, but not restricted to, automotive refinish applications.

DETAILED DESCRIPTION OF THE INVENTION

Figure 1:
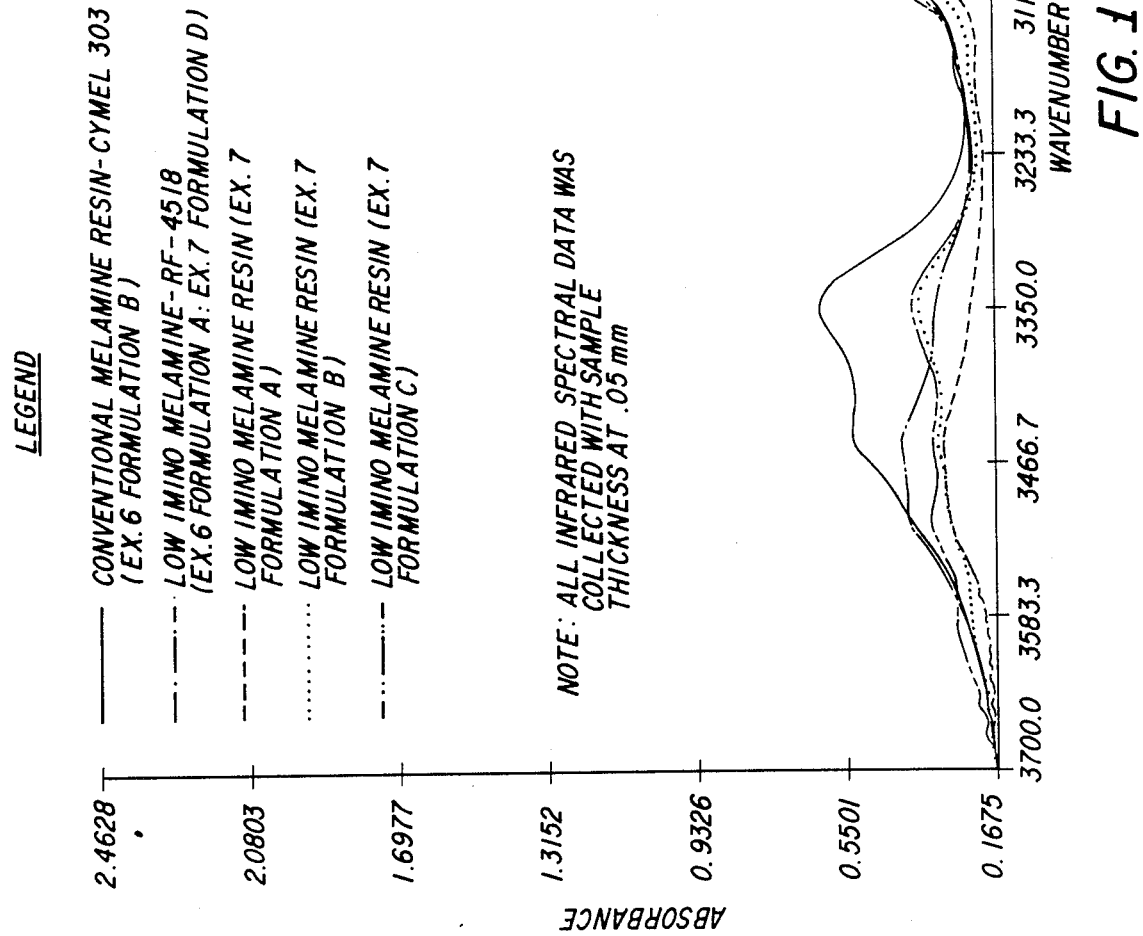
FIG. 1 shows infrared spectral data comparing a conventional melamine resin with several (A—C) low imino resins of the present invention.

The reduced temperature coating composition of the present invention contains an essential ingredient a fully alkylated, low imino aminoplast cross-linking agent. More specifically, the invention comprises a coating composition of:

a. a principle film forming resin(s) with pendant functional groups which are reactive with an aminoplast resin and, b. a substantially fully alkylated, low imino aminoplast as indicated by a lower Fourier transform infra-red spectroscopic absorption value in the region of 3250–3650 $cm^{-1}$ relative to a more conventional aminoplast such as Cymel 303 (American Cyanamid Corp.) (refer to FIG. 1) with comprising nuclei selected from the group consisting of melamine, acetoguanamine, adipoguanamine, or benzoguanamine and attached thereto alkyloxymethyl groups in the range of about 2n−2 to 2n per nucleus where n is the number of amino groups per nucleus.

The principle film forming resin or resins used in the present invention may be any type of available thermosetting resins with hydroxy, carboxyl, amide, acetoacetoxy, or mercaptan functional groups or a combination thereof. The preferred functional group is hydroxyl. Suitable resin types include acrylic, polyester (including alkyd), epoxy, polyurethane, etc., or hybrids thereof.

The term acrylic refers in the present invention to the resins typically prepared by the polymerization of ethylenically unsaturated monomers. Suitable ethylenically unsaturated monomers include acrylic and methacrylic acid and their alkyl esters such as methyl, ethyl, propyl, butyl, 2-ethyl hexyl, decyl, lauryl, stearyl, isobornyl, and the functional esters such as hydroxyethyl, hydroxypropyl, hydroxybutyl, acrylamide, acetoacetoxyethyl, glycidyl, diacrylates such as 1,4 butanediol-diacrylate, ethylene glycol dimethacrylate, 1,6 hexanediol diacrylate, ethylenically unsaturated aromatic hydrocarbons such as styrene, alpha methyl styrene, vinyl toluene, vinyl chloride, acrylonitrile, butadiene, divinylbenzene, and others such as maleic acid or anhydride, fumaric acid, allyl alcohol, crotonic acid, etc.

The term epoxy refers in the present invention to those resins constructed through an oxirane functional group reacted with a phenolic or carboxylic acid group.

Typically, these resins are a result of stoichiometric blend of epichlorhydrin with phenolics such as bisphenol A or novalac resins, and derivatives thereof, or oxirane functional resins, such as acrylic resins prepared with glycidyl acrylate or methacrylate, and derivatives thereof.

The term polyester refers in the present invention to those types generally used in baking, and ambient cure applications and includes alkyd resins. Typically, these resins are a result of a stoichiometric blend of a polyhydric alcohol with a polybasic acid. Often, monohydric alcohols or monobasic acids may be blended into the polyester for molecular weight control. These resins may or may not be modified with a saturated or unsaturated fatty acids. Examples of polyhydric alcohols include ethylene glycol, propylene glycol, neopentyl glycol, cyclohexyl dimethanol, diethylene glycol, dipropylene glycol, hydrogenated bisphenol A, 1,6 hexanediol, glycerol, trimethylol propane, pentaerythritol, sorbitol, etc. Examples of polybasic acids include maleic acid, fumaric acid, succinic acid, glutaric acid, adipic acid, phthalic acid, isophthalic acid, tetrahydrophthalic acid, itaconic acid, trimellitic acid, and the anhydrides of the above where they exist. Examples of fatty acids include those derived from the oils of linseed, soya, castor, coconut, tall, safflower, etc. Optionally, any of the aforementioned oils may be "broken" or prereacted with any of the aforementioned polyols to be later incorporated into the polyester resin.

The term polyurethane refers in the present invention to those types generally used in baking and ambient cure applications. Typically, these resins are a result of a stoichiometric blend of polyhydric alcohol with a polyisocyanate. Often, monohydric alcohols or monoisocyanates may be blended to control the molecular weight. Examples of polyhydric alcohols include those previously listed. Examples of polyisocyanates include toluene diisocyanate, diphenylmethane diisocyanate, hexamethylene diisocyanate, isophorone diisocyanate, dicyclohexyl methane diisocyanate, biurets of and isocyanurates of the aforementioned where they exist, etc.

The aminoplast resin is comprised of a nucleus or nuclei of acetoguanamine, benzoguanamine, adipoguanamine, or melamine, with the preferred being melamine. The aminoplast resin is considered to be fully alkylated, or substantially completely methylolated and subsequently substantially fully etherified with alcohol, with the number of alkyloxymethyl groups ranging from 2n-2 to 2n where n is the number of amino groups on the triazine ring. The preferred degree of polymerization of this aminoplast is from 1 to 3. The important aspect of this aminoplast is that besides the high degree of alkylation, it has a reduced number of imino groups per nucleus relative to other commercially available aminoplast cross-linking agents typically used in higher temperature curable compositions such as Cymel 303 (American Cyanamid Corp.). This high degree of alkylation and low imino content is indicated by a lower Fourier transform infra-red spectroscopic absorption value in the region of 3250–3650 cm$^{-1}$ relative to a more conventional aminoplast such as Cymel 303 (American Cyanamid Corp.) (refer to FIG. 1). It is believed that this high degree of alkylation together with a lower imino content is responsible for the observed reactivity at reduced temperatures. This reactivity is manifested by the superior film properties of the formulated coating at reduced temperatures.

The term imino refers to those substituted amine groups radiating from the triazine nucleus. The preparation of an amino resin involves the methylolation and subsequent alcohol etherification of these same imino groups. The imino groups are those which are not completely reacted and are schematically represented as:

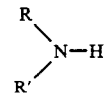

where
R = a carbon from the triazine nucleus.
R' = an alkyloxymethyl group such as:
 —CH2-O-CH3,
 —CH2-O-C4H5,
 —CH2-O-C8H17, etc.

The term reduced temperatures refers to in the present invention at or below 71 degrees C. and preferably ambient temperatures.

The preferred aminoplast resin is supplied by Monsanto Corporation under the designation Resimene RF-4518 (refer to FIG. 1). It is reported to be a fully alkylated melamine with a mixture of methyloxy and 2-ethylhexyloxy ethers. Similar fully alkylated, low imino aminoplasts with other ethers, such as butyloxy and isobutyloxy, have exhibited similar properties and can be used according to this invention.

The components of the coating composition may be combined in various amounts to provide a curable composition. A curable coating is one which forms a cross-linked film that achieves certain acceptable physical and appearance requirements for an intended application. The amount of aminoplast resin is selected to provide a sufficient concentration of alkoxymethyl groups to provide an adequate degree of cross-linking by reaction with the functional groups on the principle film forming resin. Advantageously, the concentration of alkoxymethyl groups is in the range of about 1 to about 6 per functional group on the principle film forming resin. Coating viscosity and non-volatile requirements depend on the application.

The coating composition of the invention may be colored with a pigment usually employed for coloring of such coating compositions such as organic, inorganic, aluminium flake, mica flake, etc.

The coating composition of the invention may also have incorporated therein other additives such as wetting agents, conditioning agents, rheology control agents, ultra violet light stabilizers, plasticizers, antioxidants, fungicides, etc.

In addition to the foregoing components, the coating compositions employed may contain lower molecular weight reactive diluents. These reactive diluents are generally added to improve non-volatile content. Examples of suitable reactive diluents are the aforementioned polyhydric alcohols and other functional monomeric or oligomeric materials.

In order to achieve sufficient cure at lower temperatures in a reasonable length of time, it may be necessary to include a catalyst in the coating composition. Strong acid catalysts are generally preferred. Examples of suitable catalysts are para toluene sulfonic acid, methane sulfonic acid, butyl acid phosphate, phenyl acid phosphate, hydrochloric acid, dodecylbenzene sulfonic acid, dinonylnaphthalene sulfonic acid along with other organic and mineral acids having at least one active hydrogen per molecule. Metal salts, such as zinc nitrate, also have exhibited some catalytic effect.

The application of the coating composition of the invention may be executed by a conventional method. That is, the composition may be applied by brushing, roller coating, calendering, dip coating, flow coated, air atomized, cetrifugally atomized, electrostatically applied, etc.

The coating composition of the present invention may be applied to a variety of materials such as glass, metal, stone, wood, plastics, and previously coated materials.

The coating composition of the present invention may be at 100% non-volatile content, solvent reducible, or water reducible. In general practice, resins are made water reducible by salting pendant carboxylic acid or amine groups on the polymer chain with a volatile amine or acid, respectively.

EXAMPLES

The following examples are intended to illustrate the invention:

Example #1: Silver Topcoat

A silver topcoat was prepared as follows:

| Component A: | Parts by volume |
|---|---|
| MS-6 solvent blend | 100.0 |
| MB-081 aluminium mill base | 600.0 |
| MB-952 titanium dioxide mill base | 30.0 |
| MB-431 carbon black mill base | 5.0 |
| MB-055 clear base | 265.0 |
| Total | 1000.0 |

All of the above mentioned bases and solvent blends are sold commercially as the "Miracryl-II" line by BASF Corporation, Inmont division.

Component B:
p-toluene sulfonic acid solution
(40% n.v. in 2-propanol)

| Component C: | Parts by weight |
|---|---|
| RF-4518 | 10.41 |
| MS-6 solvent blend | 35.26 |
| Total | 45.67 |

Component C was added to the mixture of Component B and Component A, according to the following ratio:

| | Parts by weight |
|---|---|
| Component A | 100.00 |
| Component B | 3.17 |
| Component C | 45.67 |
| Total | 148.84 |

Blended well, and applied via air atomization over primed cold rolled steel. The coating was allowed to cure at ambient temperature overnight. The dry film thickness was approximately 2.5 mils. The cured film exhibited good substrate adhesion, chemical and water resistance, and hardness.

Example #2: Primer Surfacer

| | Parts by weight |
|---|---|

A primer surfacer was prepared according to the following:

| Mill base: | |
|---|---|
| Polyester resin solution | 19.02 |
| (90% n.v. in propylene glycol-monoether acetate with a hydroxyl number of 175) | |
| Nitrocellulose solution | 20.35 |
| (23.5% n.v. in a complex mixture of alcohols, esters, and ketones) | |
| toluene | 3.30 |
| isobutyl acetate | 7.79 |
| butyl acetate | 13.36 |

Example #2: Primer Surfacer (continued)

| | Parts by weight |
|---|---|
| methyl ethyl ketone | 4.98 |
| montmorillonite clay | 0.82 |
| anti-settling agent | 0.58 |
| fumed silica | 1.07 |
| magnesium silicate | 24.24 |
| carbon black | 2.90 |
| titanium dioxide | 0.20 |
| red iron oxide | 1.23 |
| citric acid | 0.16 |
| Total | 100.00 |

The constituents were charged to a mill and dispersed until an average particle size of 35 microns was obtained

| Component A: | |
|---|---|
| Mill base | 69.62 |
| p-toluene sulfonic acid | 2.07 |
| (40% solution in 2-propanol) | |
| Total | 71.69 |
| Component B: | |
| RF-4518 | 10.90 |
| butyl acetate | 17.41 |
| Total | 28.31 |

Component B was added to Component A according to the following ratio:

| Component A | 71.69 |
|---|---|
| Component B | 28.31 |
| Total | 100.00 |

Blended well, applied by air atomization over abraded cold rolled steel and cured at ambient temperature overnight. The dry film thickness was approximately 2.8 mils. The cured film exhibited good sandability, and adhesion to the substrate and as a substrate.

Example #3: Clear Acrylic Coating

An acrylic clearcoat was prepared according to the following formula:

| Component A: | Parts by weight |
|---|---|
| acrylic resin solution | 40.30 |
| (55% n.v. in high flash aromatic naphtha 100 and xylene with a hydroxyl number of 128) | |
| U.V. light stabilizer | 1.20 |
| ethanol | 19.80 |
| methyl isobutyl ketone | 21.00 |
| butyl acetate | 2.60 |
| p-toluene sulfonic acid | 0.40 |
| (40% n.v. in 2-propanol) | |
| Total | 85.30 |
| Component B: | |
| RF-4518 | |

Component B was added to Component A in according to the following ratio:

| | Parts by weight |
|---|---|
| Component A | 85.30 |
| Component B | 12.60 |
| Total | 100.00 | blended well, and applied via air atomization over a dry lacquer color basecoat. The film was then allowed to cure at ambient temperature overnight. The cured film was tested for Konig hardness and water resistance by allowing a spot of water on the film to evaporate while in a 120 F. oven. The one week aged film was tested for humidity resistance by placing the film in a cabinet with 100% humidity at 100 F. for one week. The following results were obtained:

| Gloss (20) | 90 |
|---|---|
| Konig Hardness (sec) | 14.2 |
| Water Resistance | good |
| Humidity Resistance | excellent |

Example #4: Polyester Clearcoat

A polyester clearcoat was prepared according to the

Example #4: Polyester Clearcoat following
| Component A: | Parts by weight |
|---|---|
| polyester resin solution | 31.90 |
| (60% n.v. in xylene with a | |
| hydroxyl number of 115) | |
| cellulose acetate butyrate solution. | 25.40 |
| (30% n.v. in butyl acetate) | |
| ethanol | 10.50 |
| methyl isobutyl ketone | 8.90 |
| 2-propanol | 3.30 |
| methyl ethyl ketone | 4.90 |
| Exxate 600 solvent | 7.00 |
| p-Toluene sulfonic acid | 0.70 |
| Total | 92.60 |
| Component B: | |
| RF-4518 | |

Component B was added to Component A in the following ratio:
| | Parts by weight |
|---|---|
| Component A | 92.60 |
| Component B | 7.40 |
| Total | 100.00 |

Blended well and applied via air atomization over a dry lacquer color basecoat. The film was allowed to cure at room temperature overnight. The dry film thickness was approximately 2.0 mils. The film was tested for Konig hardness and water resistance by allowing a spot of water on the film to evaporate while in a 120 F. oven. The one week aged film was tested for humidity resistance by placing the film in a cabinet with 100% humidity at 100 F. for one week. The following test results were obtained:

| Gloss (20) | 76 |
|---|---|
| Konig Hardness (sec) | 12.8 |
| Water Resistance | excel. |
| Humidity Resistance | excel. |

Example #5: Polyurethane Clearcoat

A polyurethane clearcoat was prepared as follows:
| Part A | Parts by weight |
|---|---|
| Polyurethane resin solution | 40.40 |
| (64% n.v. in xylene and methyl | |
| isobutyl ketone with a hydroxyl number | |
| of 107) | |
| ethanol | 10.60 |
| methyl isobutyl ketone | 15.80 |
| butyl acetate | 9.00 |
| isopropanol | 3.30 |
| methyl ethyl ketone | 5.00 |
| Exxate 600 | 7.00 |
| p-toluene sulfonic acid | 0.70 |
| Total | 91.80 |
| Part B: | |
| RF-4518 | |

Component B was added to Component A in the following ratio:
| Component A | 91.80 |
|---|---|
| Component B | 8.20 |
| Total | 100.00 |

Blended well and applied via air atomization over a dry lacquer color basecoat. The film was allowed to cure at ambient temperature overnight. The dry film thickness was approximately 2.0 mils. The cured film was tested for Konig hardness and water resistance by allowing a spot of water on the film to evaporate while in a 120 F. oven. The one week aged film was tested for humidity resistance by placing the film in a cabinet with 100% humidity at 100 F. for one week. The following results were obtained:

| Gloss (20) | 87 |
|---|---|
| Konig Hardness (sec) | 7.1 |
| Water Resistance | excel. |
| Humidity Resistance | excel. |

Example #6: Comparison of a fully alkylated, low imino amino resin versus a conventional amino resin in a clearcoat (refer to FIG. 1).

| Clear Base: | Parts by weight |
|---|---|
| acrylic resin solution | 28.80 |
| (55% n.v. in xylene and high flash | |
| aromatic naphtha with a hydroxyl | |
| number of 128) | |
| polyester resin solution | 2.20 |
| (80% n.v. in toluene and xylene | |
| with a hydroxyl number of 200) | |
| cellulose acetate butyrate solution | 23.10 |
| (30% n.v. in butyl acetate) | |
| U.V. light stabilizer | 1.00 |
| methyl isobutyl ketone | 26.30 |
| butyl acetate | 7.80 |
| p-toluene sulfonic acid | 0.40 |
| Total | 89.60 |

The two clearcoats were prepared by blending the following:
| Formulation A: | Parts by weight |
|---|---|
| clear base | 89.60 |
| RF-4518 | 10.40 |
| (a low imino melamine resin | |
| supplied by Monsanto Corp.) | |
| Total | 100.00 |
| Formulation B: | Parts by weight |
| clear base | 89.60 |
| Cymel 303 | 10.40 |
| (a conventional melamine resin | |
| supplied by American Cyanamid Corp.) | |
| Total | 100.00 | and applying via air atomization over a dry lacquer color basecoat. The films were allowed to cure at ambient temperature overnight. The dry film thicknesses were approximately 2.0 mils. The cured films were tested for Konig hardness and water resistance by allowing a spot of water on the film to evaporate while in a 120 F. oven. The one week aged films were tested for humidity resistance by placing the films in a cabinet with 100% humidity at 100 F. for one week. The following results were obtained:

| | Formulation A | Formulation B |
|---|---|---|
| Gloss (20) | 85 | 87 |
| Konig Hardness (sec) | 19.9 | 14.9 |
| Water Resistance | good | poor-whitening |
| Humidity Resistance | excel. | poor-dulling |

Example #7: Clearcoats prepared with four fully alkylated, low imino amino resins (refer to FIG. 1).

The four clearcoats were prepared by blended the following:
| Clear Base: | Parts by weight |
|---|---|
| acrylic resin solutin | 28.80 |
| (55% n.v. in xylene and high flash | |
| aromatic naphtha with a hydroxyl | |
| number of 128) | |
| polyester resin solution | 2.10 |
| (80% n.v. in toluene and xylene | |
| with a hydroxyl number of 200) | |
| cellulose acetate butyrate solution | 23.50 |
| (30% n.v. in butyl acetate) | |
| U.V. light stabilizer | 1.10 |
| ethanol | 15.30 |
| methyl isobutyl ketone | 16.20 |
| p-toluene sulfonic acid solution | 1.80 |
| (40% n.v. in 2-propanol) | |
| Total | 89.40 |
| Formulation A: | Parts by weight |
| clear base | 89.40 |
| fully alkylated, low imino melamine resin | 10.60 |
| (substituents composed of | |
| n-butyloxymethyl and i-butyloxymethyl | |
| groups) | |
| Total | 100.00 |
| Formulation B: | Parts by weight |
| clear base | 89.40 |
| fully alkylated, low imino melamine resin | 10.60 |

Example #7: Clearcoats prepared with four fully alkylated, low imino amino resins (refer to FIG. 1).

| | |
|---|---|
| (substituents composed of methyloxymethyl and n-butyloxymethyl groups) | |
| Total | 100.00 |
| Formulation C: | Parts by weight |
| clear base | 89.40 |
| fully alkylated, low imino melamine resin | 10.60 |
| (substituents composed of methyloxymethyl and n-butyloxymethyl groups) | |
| Total | 100.00 |
| Formulation D: | Parts by weight |
| clear base | 89.40 |
| fully alkylated, low imino melamine resin | 10.60 |
| (substituents composed of methyloxymethyl and 2-ethyloxymethyl groups) | |
| Total | 100.00 | and applying via air atomization over a dry lacquer color basecoat. The films were allowed to cure at ambient temperature overnight. The dry film thicknesses were 2.0 mils. The cured films were tested for Konig hardness and water resistance by allowing a spot of water on the film to evaporate while in a 120 F. oven. The two week aged films were tested for humidity resistance by placing them in a cabinet with 100% humidity at 100 F. for one week. The following results were obtained:

| Formulation: | A | B | C | D |
|---|---|---|---|---|
| Gloss (20) | 78 | 87 | 85 | 85 |
| Konig Hardness (sec) | 22.7 | 21.3 | 21.3 | 25.6 |
| Water Resistance | excl. | excl. | good | excl. |
| Humidity Resistance | excl. | excl. | excl. | excl. |

We claim:

1. A coating composition comprising:
   (a) A principle film forming resin containing pendant functional groups which are reactive with an aminoplast resin and,
   (b) a fully alkylated, low imino aminoplast resin, wherein the coating cures at ambient temperature.

2. The coating composition of claim 1 wherein the film forming resin is selected from the group consisting of acrylic, polyester including alkyd, polyurethane, and epoxy.

3. The coating composition of claim 1 wherein the fully alkylated, low imino aminoplast resin contains a nucleus selected from the group consisting of melamine, adipoguanamine, acetoguanamine, and benzoguanamine.

4. The coating composition of claim 3 wherein the fully alkylated, low imino aminoplast resin contains an alkyloxymethyl group in the range of about $2n-2$ to $2n$ per nucleus where n is the number of amino groups per nucleus.

5. A coating composition comprising:
   (a) a principle film forming resin containing pendant reactive hydroxyl groups and
   (b) a fully alkylated, low imino aminoplast resin, wherein the coating cures at ambient temperature.

6. The coating composition of claim 5 wherein the film forming resin is selected from the group consisting of acrylic, polyester including alkyd, polyurethane, and epoxy.

7. The coating composition of claim 5 wherein the fully alkylated, low imino aminoplast resin contains a nucleus selected from the group consisting of melamine, acetoguanamine, adipoguanamine, and benzoguanamine.

8. The coating composition of claim 7 wherein the fully alkylated, low imino aminoplast resin contains an alkyloxymethyl group in the range of about $2n-2$ to $2n$ where n is the number of amino groups per nucleus.

* * * * *